United States Patent
Meintschel et al.

(10) Patent No.: US 9,012,069 B2
(45) Date of Patent: Apr. 21, 2015

(54) SINGLE CELL FOR A BATTERY FOR MAKING ELECTRICAL CONTACT

(75) Inventors: Jens Meintschel, Bernsdorf (DE); Dirk Schroeter, Winnenden (DE)

(73) Assignee: Daimler AG, Stuttgart (DE)

( * ) Notice: Subject to any disclaimer, the term of this patent is extended or adjusted under 35 U.S.C. 154(b) by 1000 days.

(21) Appl. No.: 12/672,176

(22) PCT Filed: Jul. 29, 2008

(86) PCT No.: PCT/EP2008/006230
§ 371 (c)(1),
(2), (4) Date: Apr. 15, 2010

(87) PCT Pub. No.: WO2009/018943
PCT Pub. Date: Feb. 12, 2009

(65) Prior Publication Data
US 2010/0203379 A1      Aug. 12, 2010

(30) Foreign Application Priority Data

Aug. 6, 2007   (DE) .................... 10 2007 036 847
Dec. 20, 2007  (DE) .................... 10 2007 063 184

(51) Int. Cl.
*H01M 2/02*    (2006.01)
*H01M 2/26*    (2006.01)
*H01M 10/04*   (2006.01)

(52) U.S. Cl.
CPC ........... *H01M 2/266* (2013.01); *H01M 2/0212* (2013.01); *H01M 10/0413* (2013.01)

(58) Field of Classification Search
CPC ........................ H01M 6/12; H01M 10/0413
USPC ......... 429/133, 162, 163, 179, 182, 232, 233, 429/178
See application file for complete search history.

(56) References Cited

U.S. PATENT DOCUMENTS 5,397,659 A      3/1995   Imhof et al.
6,225,778 B1 *   5/2001   Hayama et al. ............... 320/112
(Continued)

FOREIGN PATENT DOCUMENTS

DE    42 40 339 C1   12/1993
JP    61-126765 A     6/1986
(Continued)

OTHER PUBLICATIONS

International Search Report dated Dec. 30, 2008 and translation of relevant portions thereof (16 pages).
(Continued)

*Primary Examiner* — Ula C. Ruddock
*Assistant Examiner* — Thomas H. Parsons
(74) *Attorney, Agent, or Firm* — Crowell & Moring LLP

(57) ABSTRACT

A single cell for a battery includes electrodes, preferably electrode foils, which are arranged within a cell housing. A current output lug is electrically connected to each electrode, and at least electrodes of opposite polarity are separated and electrically insulated from one another by a separator, preferably a separator foil. Current output lugs having the same polarity are electrically conductively connected to a pole, wherein the respective poles are guided from the interior of the cell housing to the outside. Each pole is electrically conductively connected to an electrically conductive area on an outer side of the cell housing, wherein the relevant two areas of different polarity are electrically insulated from one another. The pole lugs which are arranged on the relevant areas project in a free-standing manner out of the cell housing.

16 Claims, 2 Drawing Sheets

(56) References Cited

U.S. PATENT DOCUMENTS

| | | | |
|---|---|---|---|
| 6,387,566 B1 | 5/2002 | Chang et al. | |
| 7,008,720 B2 * | 3/2006 | Shimamura et al. | 429/179 |

FOREIGN PATENT DOCUMENTS

| | | | |
|---|---|---|---|
| JP | 7-142041 A | | 6/1995 |
| JP | 09185962 | * | 7/1997 |
| JP | 2002-190295 A | | 7/2002 |
| JP | 2004-31272 A | | 1/2004 |
| JP | 2006-31979 A | | 2/2006 |
| JP | 2006-40694 A | | 2/2006 |
| JP | 2006-164922 A | | 6/2006 |
| JP | 2006164922 | * | 6/2006 |

OTHER PUBLICATIONS

English translation of First Office Action in Chinese Patent Application No. 200880102128.1 issued on Apr. 1, 2012, pp. 1-4.

Japanese Notification of Reasons for Refusal dated Aug. 1, 2012 (three (3) pages).

Japanese Office Action with English translation thereof dated Feb. 26, 2013 {Seven (7) Pages}.

Japanese Office Action dated Jan. 14, 2014 with English Translation (five (5) pages).

* cited by examiner

SINGLE CELL FOR A BATTERY FOR MAKING ELECTRICAL CONTACT

This application is a national stage of PCT International Application No. PCT/EP2008/006230, filed Jul. 29, 2008, which claims priority under 35 U.S.C. §119 to German Patent Application No. 10 2007 036 847.1, filed Aug. 6, 2007, and No. 10 2007 063 184.9, filed Dec. 20, 2007, the entire disclosures of which are herein expressly incorporated by reference.

BACKGROUND AND SUMMARY OF THE INVENTION

The invention relates to a single cell for a battery with electrodes (preferably electrode foils) arranged inside a cell housing, wherein a current output lug is electrically connected to each electrode and to a pole, and wherein at least electrodes of different polarities are separated and insulated from each other by a separator (preferably a separator foil). Such a battery is known, for example in energy technology, and especially to support battery-operated vehicle technology.

Especially single cells as known from German patent document DE 42 40 339 C1, which are designed as flat cells, are formed as electrode foils, aluminum and copper foils, coated with electrochemically active materials. The electrode foils are combined to form an electrode stack, wherein the single electrode foils are separated from each other electrically and also spatially by a separator, preferably a foil. A current output lug, which is guided through the cell housing, is welded to the electrode foil for a contacting of an electrode foil to the outside. As the cell housing of a single cell is usually formed of metal, preferably aluminum, the current output lugs have to be insulated electrically amongst others in the feedthrough region.

The tightness of the cell housing in the feedthrough region can only be manufactured with difficulty and in a very elaborate manner. This problem especially relates to the compression strength and the sealing against humidity. A humidity entry thus has to be seen as a difficult problem, which can be solved in a particularly elaborate manner.

One object of the invention is to provide a single cell of a battery, where the tightness of the cell housing is improved and where the production costs are preferably reduced.

This and other objects and advantages are achieved by the single cell of a battery according to the invention, which comprises electrodes, preferably electrode foils, arranged within a housing. A current output lug is thereby arranged at each electrode in an electrically conductive manner. At least electrodes of different polarity are separated in an electrically insulating manner by means of a separator (preferably a separator foil), and the current output lug is connected to a pole in an electrically conductive manner. According to the invention, each pole of the single cell is electrically connected to an electrically conductive region of an outer side of the cell housing, and designed as a lug-type extension piece of the outer side as a so-called pole lug.

By the direct contacting of the poles to regions which are electrically insulated from each other of at least one outer side of the cell housing, preferably two flat sides of the cell housing (preferably a flat cell), metallic cell walls extending partially beyond the cell body can now be used as pole lugs. It is thus possible for the electrical connection of several cells to a battery, to connect these preferably lug-type extension pieces for the purpose of an electrical series connection especially by means of spot welding.

For increasing the handling safety outside the pole lugs housing side walls are electrically insulated especially with coatings and/or thin foils in a convenient manner.

In an advantageous manner, special cross sectional surfaces of the pole lugs can be realized by molds for example for increasing the current capacity, but also for increasing the stability.

In a special manner, a pole lug is connected monolithically for this to its associated region of the corresponding outer side.

The pole lugs of a single cell are arranged at a single narrow side of the cell housing in a special manner and especially at opposite corner regions, wherein the pole lugs project with the same alignment from this narrow side for an easier accessibility.

To enable a simple and secure connection of several single cells, the pole lugs conveniently have a measured width in the direction of their common arrangement which is smaller than half (preferably smaller than a fifth and especially preferred smaller than a tenth) of the corresponding extension of the associated narrow side.

According to an advantageous further development of the invention, with several electrodes, especially electrode foils, the associated current output lugs of a single cell are welded and/or compressed with each other to a pole. These or the pole can thereby be guided from the interior of the single cell to the outside without elaborate sealing measures. The contacting thereby especially takes place by means of welding an associated outer side, so as to contact the electrode foils in the interior with the outside.

In a special manner, an edge region of the respective electrode foil guided to the outside of the electrode stack is used as the current output lug, whereby an elaborate contacting of electrode foils and current output lug is omitted. This type of contacting is at the same time very safe against at least many, especially outer influences such as impacts or vibrations.

Handling of the single cell is eased or designed in a more secure manner by inserting an electrically insulating plastics foil, especially a frame circumferentially on the edge.

In a further development of the invention, an electrically insulating frame running circumferentially around the edge is arranged between two electrically conductive flat sides of the cell housing, which frame has two material recesses insulated from each other and spaced from each other. The current output lugs of respectively one polarity are arranged in these material receptions. Advantageously, the clear height measured in the direction of the stacking of the electrodes of a material recess is smaller or the same as the corresponding extension of the associated current output lugs stacked above each other in an uninfluenced manner, and their depth measured parallel to the flat side of an electrode foil is larger or the same as the corresponding extension of the associated current output lugs. The current output lugs are hereby held securely in the material recesses and can be compressed with these in an electrically conductive manner with an especially tight connection between the frame and the outer/flat sides.

According to a further embodiment of the invention, the electrical connection between the cell housing and a "+" or "−" pole at the electrode stack is produced only during and especially after the assembly of the cell housing, and namely from the outside through a welding and/or pressing method, in a preferred manner by means of a laser beam welding method.

In a preferred manner, the housing wall of the respective outer side and further in the depth the current output lugs of the electrode stack can be melted on partially during a welding method, whereby a material-fit connection can be produced.

According to a further advantageous development of the invention, a weld seam comprises all current output lugs or passes through these, seen in the direction of the stacking of the electrodes.

According to a further development of the invention, a weld seam comprises, seen in the direction of the stacking of the electrodes, not only all current output lugs, but also the corresponding electrically conductive outer side of the cell housing of the single cell or passes through it.

In an advantageous further development of the invention, the connection of the corresponding flat side of the cell housing, especially of an aluminum housing with copper foil as a pole, can be improved by inserting a foil of additional material, e.g., nickel.

According to an advantageous further development of the invention, the poles are only switched to the corresponding outer sides, especially flat sides of the cell housing with a welding process taking place at the end. Amongst others, a possible reduction of the installation space requirement results by the mentioned by means of variable contacting positions, a better contact cooling, a reduction of the parts by multi-functional component design insulation/housing etc., reduced reject numbers by a simple contacting at the closed cell housing. The production of hermetically closed cell housings is further eased, whereby the production of humidity-tight cell housings is connected amongst others.

Other objects, advantages and novel features of the present invention will become apparent from the following detailed description of the invention when considered in conjunction with the accompanying drawings.

DETAILED DESCRIPTION OF THE DRAWINGS

Figure 1:
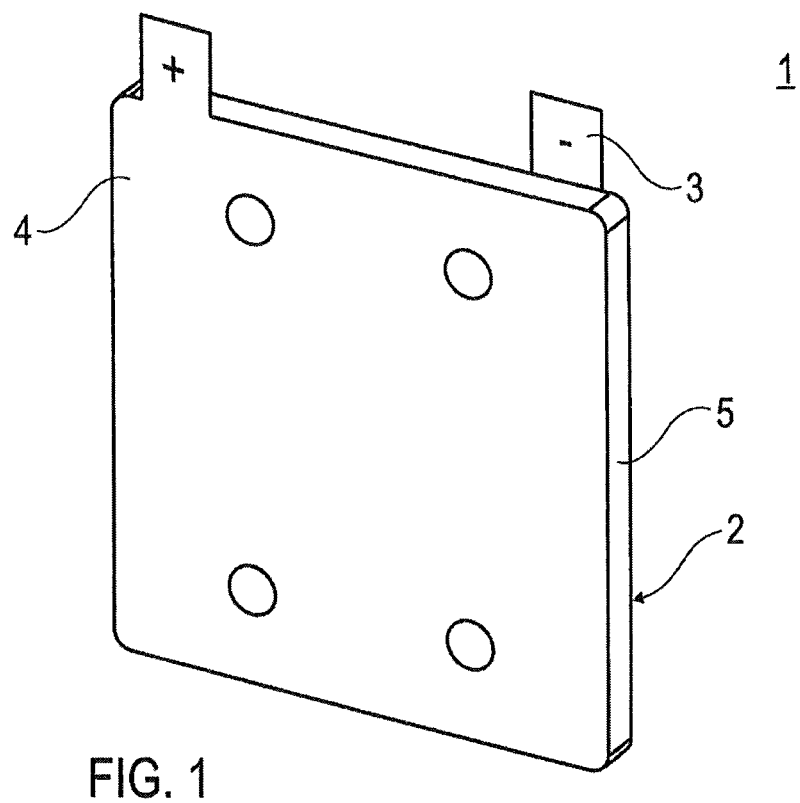
FIG. 1 is a schematic perspective view of a flat cell with lug-like extended housing side walls.

Corresponding parts are provided with the same reference numerals in all figures.

Figure 3:
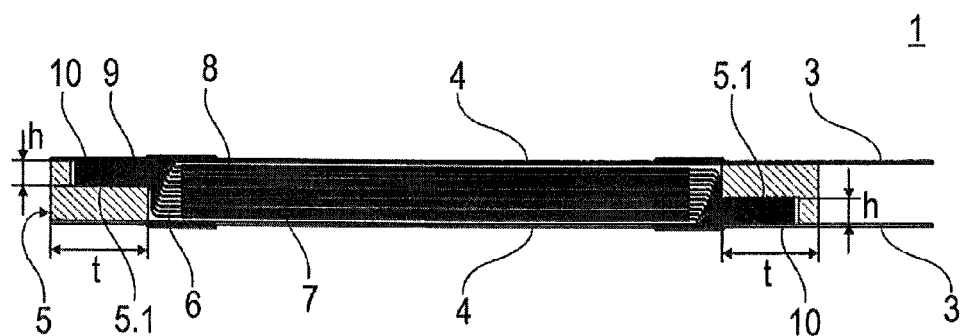
FIG. 3 is a sectional view of the flat cell shown in FIG. 2.

In FIG. 1 is shown a single cell 1, designed as a flat cell, has a cell housing 2, which is for example formed of aluminum. The cell housing 2 is formed of two outer sides 4 (also called housing plates or housing sides) arranged in a coplanar manner on top of each other and corresponding to each other. An electrode stack shown in FIG. 3 is arranged in the cell housing 2.

The outer sides 4 of the cell housing 2 are connected to the electrode stack in such a manner that they are electrically conductive. The two outer sides 4 of the cell housing 2 are electrically insulated from each other and have a different polarity.

A lug-type extension piece (a so-called pole lug) 3 is formed at the outer sides 4 for electrical contacting. The pole lugs 3 are connected to the associated outer side 4 in a monolithic manner and project in a free-standing manner from the cell housing 2. The pole lugs 3 thereby project especially from the edge of the narrow side of the associated outer side 4.

The pole lugs 3 are arranged in a region of opposite corners of the cell housing 2 at the respective outer side 4.

The pole lugs 3 have a measured width of less than a tenth of the corresponding outer side 4. The pole lugs 3 can also have another suitable measured width in the direction of their common arrangement, which is especially smaller than half, and preferably smaller than a fifth, of the corresponding extension of the associated outer side 4.

The arranged pole lugs 3 (respectively, a plus and a minus pole) guide contact elements for removing the electrical voltage generated by the single cell 1. The electrically conductive outer sides 4, especially flat sides, are separated from each other by means of a frame 5 surrounding the single cell 1 on the edge, and are especially insulated electrically from each other. The frame 5 running circumferentially is formed of plastics for this for example and has an electrically insulating property. The electrically conductive outer sides 4 are for example additionally electrically insulated to the outside for example with a coating and/or plastics foils for secure handling outside the region of the pole lugs.

Figure 2:
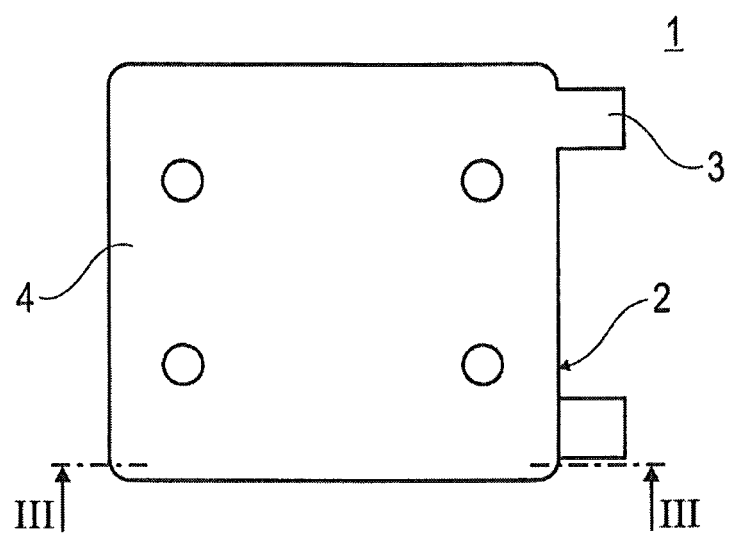
FIG. 2 is a schematic top view of a single cell, designed as a flat cell.

FIG. 2 is a top view of the single cell 1 formed as a flat cell according to FIG. 1, with pole lugs 3 formed at the electrically conductive outer sides 4.

FIG. 3 shows a sectional top view of the single cell 1 shown in FIG. 2. The single cell 1 comprises electrodes 6 arranged within the cell housing 2, especially electrode foils, which are combined to an electrode stack 7. The electrodes 6 are designed as aluminum and/or copper foils and/or of foils of such an alloy coated with electrochemically effective materials.

Electrodes 6 with different polarities are separated from each other by a separator 8, especially a separator foil. The separator 8 is for example formed as a plastics foil, especially an electrically insulating foil.

A current output lug 9 is formed at each electrode in an electrically conductive manner. The respective current output lug 9 is designed as an edge region of the respective electrode 6 guided to the outside. The electrodes 6 are welded and/or compressed to a pole 10 via their current output lugs 9 in an electrically conductive manner. When using a welding method, a weld seam comprises all current output lugs seen in the direction of the electrode stack 7 and passes through these.

The respective pole 10 is connected to a region of the outer side 4 of the cell housing 2 in an electrically conductive manner. This region is designed as a lug-type extension of the outer side 4 and forms the pole lug 3. The electrical contacting is guided to the outside by means of welding and/or compressing the abutting outer sides 4 via the electrodes 6 lying in the interior of the cell housing 2. If the electrical contacting is realized by means of welding, the weld seam comprises all current output lugs 9 and their abutting electrically conductive outer side 4 of the single cell 1.

Because the electrodes 6 and the current output lugs 9 compressed and/or welded to a pole 10 abut the outer sides, heat resulting from the charging and discharging of the individual cell 1 can be dissipated via the outer sides 4 and especially via the pole lugs 3 projecting in a free-standing manner.

The electrically insulating peripheral frame 5 is arranged between the two electrically conductive outer sides 4 of the cell housing 2. It has two electrically insulated and opposite and spaced material recesses 5.1. The current output lugs 9 of one polarity are arranged in these material recesses 5.1 in an electrically insulated manner.

The clear height h of the material recesses 5.1 is formed in such a manner that it corresponds to the corresponding extension of the current output lugs stacked without influence above each other or is smaller than it. The depth t of the material recesses 5.1 corresponds to the corresponding extension of the current output lugs 9 or is formed larger than this.

The current output lugs 9 are hereby held in the material recesses 5.1 and can be compressed with these in an electrically conductive manner with an especially tight connection between the frame 5 and the outer side 4. The electrically conductive outer sides 4 and the current output lugs 9 of the electrode stack 7 can be connected to each other by means of a welding method, e.g., a laser welding method. The outer sides 4 and the electrode stack 7 are thereby partially melted into each other.

In one arrangement of the invention, it is further possible to arrange an electrically insulating foil, not shown in detail, between the poles 10 and the flat sides 4, or to design the flat sides 4 on one side with an electrically insulating layer, so that an electrical contacting of the poles with the flat sides 4 only results with a welding of the flat sides 4 to the poles 10.

Figure 4:
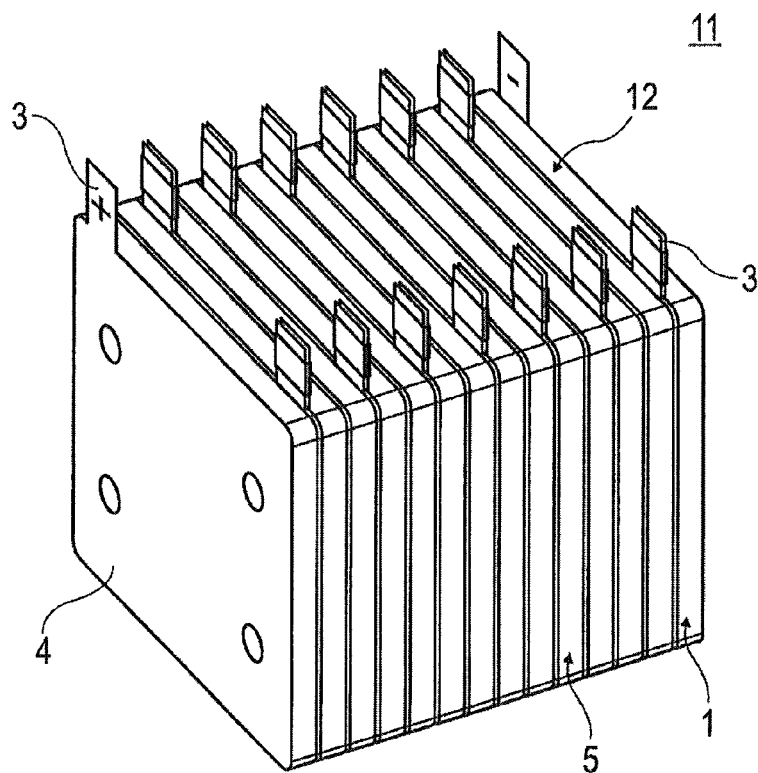
FIG. 4 is a schematic perspective view of a cell compound of switched single cells designed as flat cells.

In FIG. 4 is shown a cell compound 11 of single cells 1 designed as flat cells connected to each other. The single cells 1 are thereby arranged next to each other in a coplanar manner, wherein outer sides 4 of the respective cell housing 2 of the single cells 1 with the same polarity abut each other. The single cells 1 are thereby aligned in such a manner that their pole lugs 3 are arranged at a single longitudinal side 12 of the cell compound 11. The single cells 1 can also be aligned in such a manner in a manner not shown in detail, that their pole lugs 3 project from opposite longitudinal sides of the cell compound 11 from the respective cell housing 2.

The abutting single cells 1 are connected electrically to each other via their pole lugs 3 for an electrical connection, especially a series connection of the single cells 1. For this, the immediately adjacent pole lugs 3 having the same polarity of two single cells 1 abutting each other are connected in a form-fit and material-fit manner by means of a spot welding method or another suitable welding or pressing method. The need for additional components, as e.g., conductor rails, cell connectors and/or cell connector plates is avoided by such an electrical connection. A pole lug 3 of the single cells 1 delimiting the cell compound 11 at the end of edge side is thereby not contacted electrically. These pole lugs 3 of different polarity are formed as connection points for voltage removal of the voltage generated by the battery.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A single cell for a battery having electrodes arranged within a cell housing, wherein:
   a current output lug is arranged electrically conductively on each electrode;
   at least electrodes of different polarity are separated and insulated from one another by a separator;
   each current output lug is connected electrically conductively to a pole; and
   pole lugs that project in a free-standing manner out of the cell housing, wherein the cell housing has two electrically conductive outer sides and an electrically insulating frame arranged circumferentially therebetween, on an edge thereof, and each pole lug is electrically connected to, and projects from an outer edge of, one of the two electrically conductive outer sides,
   wherein each current output lug is arranged in a recess of the electrically insulating frame and each current output lug is covered by a respective one of the two electrically conductive outer sides, and
   wherein a circumference of the single cell has four sides, the pole lugs are arranged on a same first side of the four sides, a first one of the current output lugs is arranged on the first side of the four sides, and a second one of the current output lugs is arranged on a second side that is opposite of the first side.

2. The single cell according to claim 1, wherein pole lugs of a single cell project along a single narrow side of the cell housing, with the same alignment.

3. The single cell according to claim 1, wherein pole lugs are arranged in opposite corners of a single edge of the cell housing.

4. The single cell according to claim 3, wherein pole lugs are arranged in opposite corners of a single edge of the cell housing and have a measured width in a direction of their common arrangement which is smaller than the half of the corresponding extension of the associated edge.

5. The single cell according to claim 3, wherein pole lugs are arranged in opposite corners of a single edge of the cell housing and have a measured width in a direction of their common arrangement, which is smaller than a tenth of the corresponding extension of the associated edge.

6. The single cell according to claim 3, wherein pole lugs are arranged in opposite corners of a single edge of the cell housing and have a measured width in a direction of their common arrangement, which is smaller than a fifth of the corresponding extension of the associated edge.

7. The single cell according to claim 1, wherein the current output lugs of one polarity are attached by one of direct welding and compressing with the outer flat side of the cell housing.

8. The single cell according to claim 1, wherein the current output lugs of a pole are electrically connected to each other by one of pressing and welding.

9. The single cell according to claim 1, wherein a current output lug is an edge region of the respective electrode guided to the outside of the electrode stack.

10. The single cell according to claim 1, wherein a weld seam seen in the direction of the stacking of the electrodes comprises all current output lugs or passes through these.

11. The single cell according to claim 1, wherein a weld seam seen in the direction of the stacking of the electrodes comprises all current output lugs and the corresponding electrically conductive outer side of the single cell or passes through them.

12. The single cell according to claim 1, wherein with several electrodes within a cell housing having the same polarity, the current output lugs of a particular polarity are electrically connected to an associated electrically conductive outer side of the cell housing.

13. The single cell according to claim 1, wherein an electrode is made of a material selected from the group consisting of copper, aluminum foil, and a foil of an alloy.

14. The single cell according to claim 1, wherein:
   the two material recesses are insulated and spaced from each other;
   a clear height of a material recess, measured in a stacking direction of the electrodes is smaller or the same as a corresponding extension of the associated current output lugs stacked on top of each other in an uninfluenced manner; and
   the depth of the output lugs measured parallel to the electrically conductive outer side of an electrode foil is larger or the same as the corresponding extension of the associated current output lugs.

15. The single cell according to claim 1, wherein electrodes of a first one of the different polarities are connected to the first one of the current output lugs on the first side and electrodes of a second one of the different polarities are connected to the second one of the current output lugs on the second side.

16. The single cell according to claim 1, wherein the current output lugs do not project beyond the cell housing.

* * * * *